United States Patent
Furman et al.

(10) Patent No.: US 6,493,443 B1
(45) Date of Patent: Dec. 10, 2002

(54) SELF-GENERATING RETURN CALL SERVICE

(75) Inventors: Daniel S. Furman, Summit; David P. Silverman, Somerville, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/519,775

(22) Filed: Mar. 7, 2000

(51) Int. Cl.[7] .................. H04M 3/42; H04M 3/424; H04M 3/44; H04M 15/06
(52) U.S. Cl. .................. 379/210.01; 379/127.01; 379/142.04; 379/207.04; 379/216.01
(58) Field of Search ............... 379/201.01, 201.02, 379/201.12, 207.02, 207.04, 207.05, 207.08, 207.11, 209.01, 210.01, 216.01, 127.01, 142.04

(56) References Cited

U.S. PATENT DOCUMENTS 5,768,359 A * 6/1998 DiPierro et al. ....... 379/209.01
5,943,397 A   8/1999 Gabin et al. ........ 379/210.01 X
5,943,409 A * 8/1999 Malik .................... 379/209.01

* cited by examiner

*Primary Examiner*—Harry S. Hong
(74) *Attorney, Agent, or Firm*—Mendelsohn & Associates PC

(57) ABSTRACT

A technique for bridging the gap between an initial call and a return call by using network capabilities to capture the caller's information and by providing efficacious means for reaching the caller at a later time. The subscribed user, i.e., the called party, is provided with an opportunity to access a self-generating return call list which stores the names and the telephone numbers of the callers who could not speak to the subscribed user e.g., the subscribed user was not available to answer within a predetermined number of rings or was busy with another call. In addition, the system may be configured to create entries in the return call list for all incoming calls to the subscribed user, irrespective of whether the incoming calls were answered or not. The subscribed user may at any time access the return call list, either from his own telephone or some other DTMF telephone set.

8 Claims, 4 Drawing Sheets

SELF-GENERATING RETURN CALL SERVICE

BACKGROUND OF THE INVENTION

1. Field of the Invention

The present invention relates to telephone systems, and, in particular, to telephone systems capable of offering enhanced telecommunications services.

2. Description of the Related Art

A significant number of telephone calls go unanswered, with their intended purpose defeated, as a result of the called party's either being not available to answer or being busy on another call. Although a number of remedies for this problem have been proposed, for example, the use of answering service bureaus or private answering machines, or the implementation of customized call-waiting telephone service, these have not proven particularly satisfactory due to cost, inadequate response time, or general inconvenience.

Response to a message recorded on a common answering machine, for instance, usually requires an intermediate transcription of the caller's number with subsequent dialing of that number by the user. More expensive and sophisticated answering machines provide means for digitally recording a phone number input by an unanswered caller, to be later displayed or automatically dialed,.at the option of the called party. However, such equipment is permanently affixed to a user's phone line and can only be utilized at the user's premises.

There has also been proposed an automatic return call service within the user's local telephone switching system which would provide for the switch, upon the user's requesting signal, to place a call to the memory-stored number of the party who had last called the user's telephone number. While this procedure eliminates some of the earlier-noted drawbacks of prior alternatives, it unfortunately introduces disadvantages of its own. Among these are the limitation of retained call identification to only the single most recent call, and the lack of knowledge or consent on the part of the calling party with respect to retention of the number.

Each of the foregoing approaches requires that the called telephone be simply unattended, and not otherwise engaged as a busy line. Under the latter condition, call-waiting services provide some relief, but suffer from such undesirable aspects as persistent conversation interruption and lack of busy line awareness on the part of the calling party in the event of non-response by the called user.

SUMMARY OF THE INVENTION

The need has thus long persisted for a system which can provide the called user with the ability to implement options which will enable the completion of any number of calls which the customer was unable to answer over an extended span of time, as well as to automatically create a log of all incoming calls.

The present invention provides a technique for bridging the gap between an initial call and a return call by using network capabilities to capture the caller's information and provide efficacious means for reaching the caller at a later time. In accordance with one embodiment of the present invention, the subscribed user, i.e., the called party, is provided with an opportunity to access a self-generating return call list which stores the names and the telephone numbers of the callers who could not speak to the subscribed user, e.g., the subscribed user was not available to answer within a predetermined number of rings or was busy with another call. The return call list also includes date and time of each missed call.

In addition, the system may be configured to create entries in the return call list for all incoming calls to the subscribed user, irrespective of whether the incoming calls were answered or not. In this configuration, as soon as the call for the subscribed user is received at a destination central office, the corresponding automatic number identification (ANI) (i.e., the telephone number of the calling party) is captured. Other related caller identification information available from a network database is also retrieved. The ANI and other information are then added to a return call list to be stored in a local database easily accessible to the subscribed user.

In either configuration, the system may prompt each caller by means of a prerecorded announcement whether they wish to be added to the return call list of the called party. If the caller responds in the positive, the system retrieves general information about the caller, e.g., his/her name, and creates an entry in the return call list prior to caller disconnect. Otherwise, a normal disconnect will take place when the caller hangs up.

The subscribed user may at any time access the return call list, either from his own telephone or some other DTMF telephone set. The system also permits the user to review entries in the list, add an entry, delete an entry, or access any one of other special services to which the subscribed user may be subscribed. The subscribed user may access the enhanced services related to the return call list either by touch-tone or voice prompts.

In one embodiment, the present invention is a method for processing telephone calls, comprising the steps of (a) receiving an incoming telephone call from a caller intended for a service subscriber; (b) automatically capturing caller information and generating an entry in a return call list for the service subscriber; and (c) enabling the service subscriber to subsequently access the return call list to retrieve the entry for the caller and place a return telephone call to the caller without requiring the service subscriber to enter a telephone number for the caller.

In another embodiment, the present invention is a system for processing telephone calls, comprising (a) means for receiving an incoming telephone call from a caller intended for a service subscriber; (b) means for automatically capturing caller information and generating an entry in a return call list for the service subscriber; and (c) means for enabling the service subscriber to subsequently access the return call list to retrieve the entry for the caller and place a return telephone call to the caller without requiring the service subscriber to enter a telephone number for the caller.

Yet in one more embodiment, the present invention is a, a telephone call processing sub-system in a telephone network, comprising a processor configured to the telephone network; and a database memory configured to the processor. The processor is configured to receive caller information regarding an incoming telephone call from a caller intended for a service subscriber; to automatically generate an entry in a return call list for the service subscriber and stored in the database memory; and the processor enables the service subscriber to subsequently access the return call list from the database memory to retrieve the entry for the caller and place a return telephone call to the caller without requiring the service subscriber to enter a telephone number for the caller.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
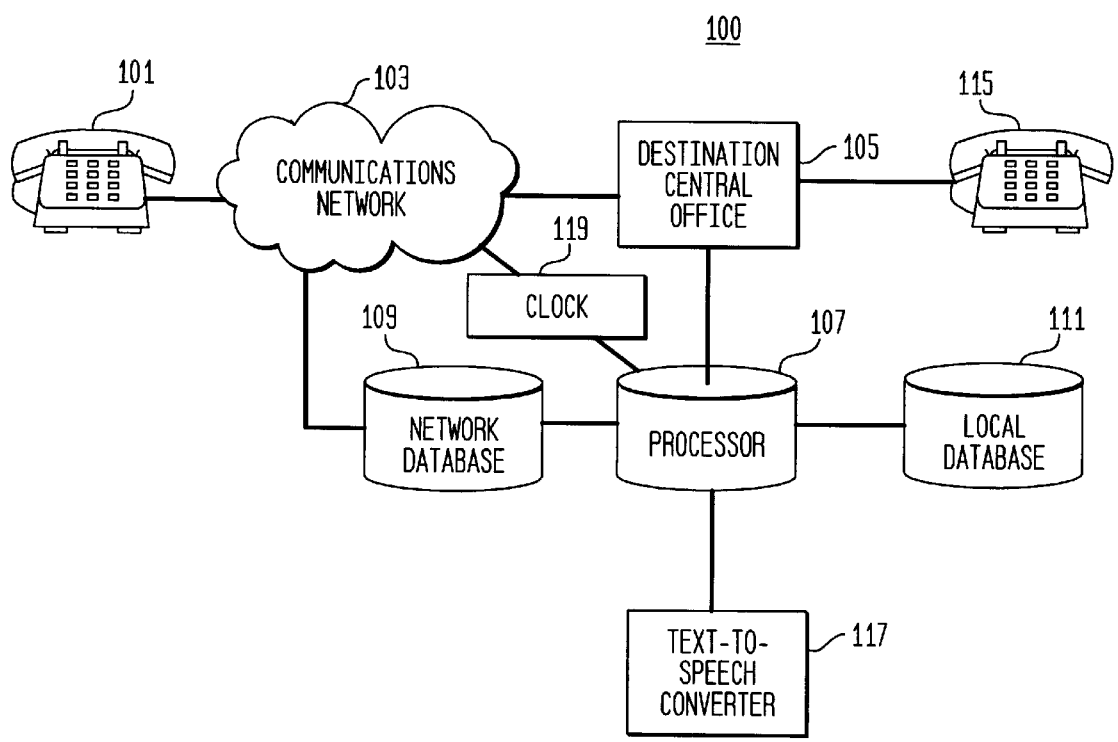
FIG. 1 shows, in simplified form, an exemplary telephone network embodying the principles of the invention.

The present invention provides an additional home or office telephone service, not provided by prior-art network-based or premise-based services or systems, which may also be adapted for the needs of a mobile user.

In accordance with one embodiment of the present invention, any callers who could not speak to a subscribed user are identified by the system and the identifying information related to those callers is stored in a local database. The identifying information may include the caller's automatic number identification (ANI), which may be verified by a query by the system to the calling party, who may confirm the ANI or enter an alternative number. The identifying information also includes the name of the caller, and the date and time of each call.

For example, when the system determines that a call to a subscribed user can not be completed due to a busy line or the subscribed user being unavailable, the system captures the ANI of the calling number and retrieves relevant caller identification information associated with the caller and saves this information in a return call list. Prior to acquiring this information, the caller may first be asked whether he/she desires to be included in the return call list. For example, the system may send an in band inquiry stating, "The party you have dialed is not available. Would you like to include your name telephone number in the return call list?" At this point, the system waits for a confirmation from the caller. After the confirmation, the identifying information is stored in the return call list. When the subscribed user later decides to return phone calls, the user accesses the return call list and retrieves the relevant caller information.

In another alternative configuration (e.g., selected by the subscribed user), the system is configured to capture identifying information of all callers who called the subscribed user. In this configuration, as soon as the caller dials the personal telephone number of the subscribing user, the system identifies this called number as a number of the subscribed user. The system then captures the ANI of the calling number, retrieves relevant caller identification information associated with the caller, and saves this information in a return call list. The system may also verify the retrieved information with the caller. In case of verification, the system may prompt to the caller "You have dialed a party which requests entry of this call in his return call list. Would you like to include your information in the return call list?" At this point, the system waits for a confirmation from the caller. After the confirmation, the identifying information is stored in the return call list. When the subscribed user later decides to return phone calls, the subscribed user accesses the return call list and retrieves the relevant caller information. The return call list also includes the date and time of each call.

Thus, the present invention bridges the gap between an initial call and the return call by using network capabilities to capture the caller's information and provide efficacious means for reaching the caller at a later time. The present invention may also be practiced in connection with a personal mobile communications system.

Shown in FIG. 1, in a simplified form, is an exemplary telephone network 100 which may be adapted to implement the present invention. In this exemplary case, telephone network 100 comprises an originating telephone 101, a communications network 103, a destination central office switch 165, and a destination telephone 115. Depending on the locations of originating telephone 101 and destination telephone 115, communications network 103 may be a local telephone network or a long distance network.

Telephone network 100 also comprises a processor 107, a network database 109, and a local database 111. Generally, network database 109 stores data related to callers, e.g., caller names, and associated telephone numbers. Such databases are known in art. One such database is LIDB provided by AT&T Corp., Baskins Ridge, N.J. Processor 107 is directly connected to retrieve relevant information from network database 109. In this example, processor 107 is also connected to local database 111. After appropriate caller information is captured by processor 107, an entry for a return call list is created and stored in local database 111. Optionally, processor 107 is also connected to a text-to-speech converter 117 having capabilities of converting caller ID text information to audio signals. These audio signals assist in announcing caller names and other related information to the subscribed user. Processor 107 is also connected to a network clock 119 that provides the date and time stamp for each call.

Figure 2:
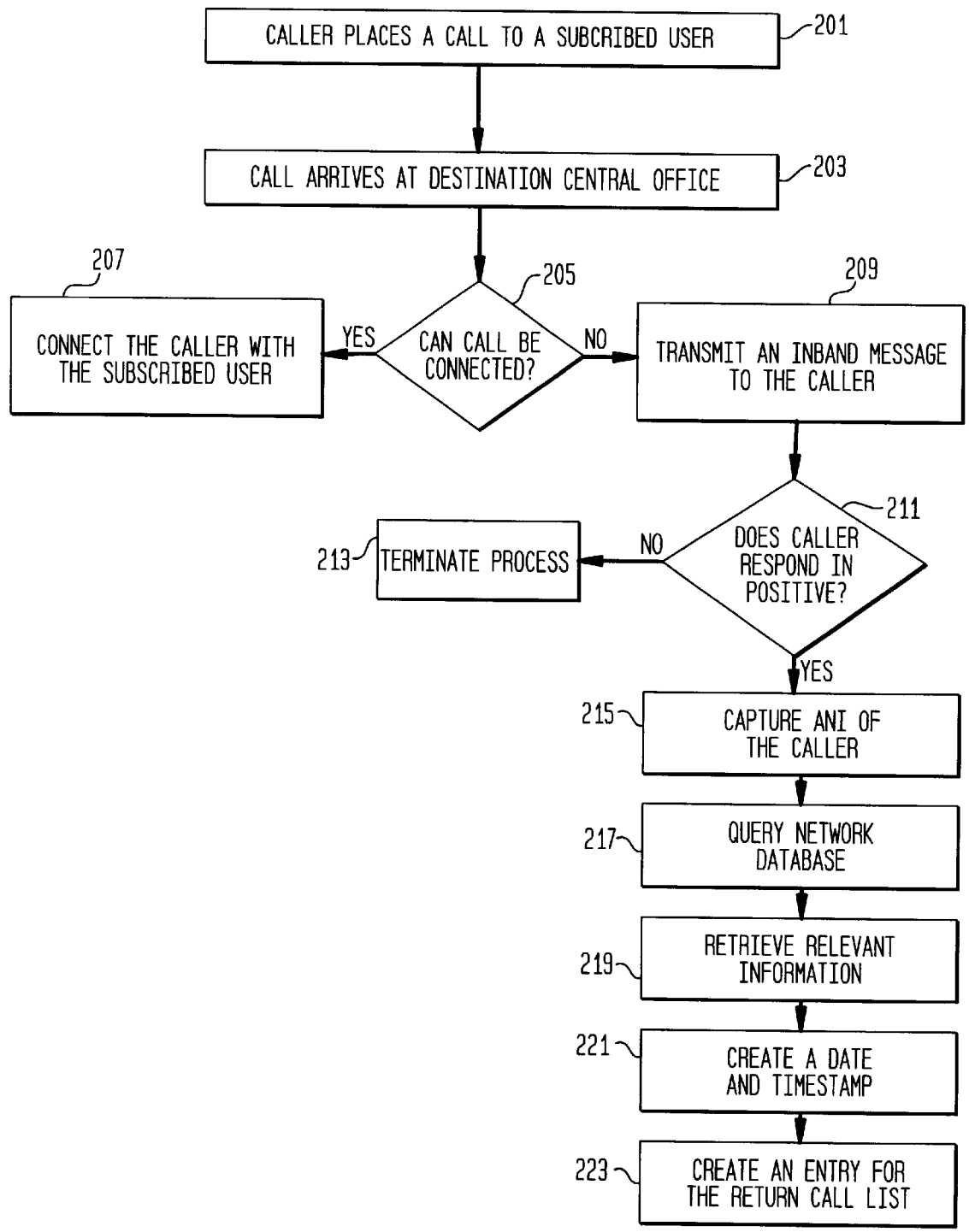
FIG. 2 shows a flow chart of an exemplary process for managing a telephone call to the subscribed user in accordance with a first embodiment of the present invention.

FIG. 2 represents an operational flow chart for handling a call to a user subscribed to the self-generating return call service in accordance with one embodiment of the present invention. Preferably, the self-generating return call service is offered as a subscription feature wherein the subscribed user is provided with the names and numbers of the callers who could not speak to the subscribed user. The dialed number (i.e., the number of the subscribed user) could be any number, including for example, a plain old telephone service (POTS) number, a pager number, an 800 number, a mobile phone number, or a personal calling number.

The process begins in step 201 when a caller places a call to the telephone number of an individual who is subscribed to the self-generating return call service (e.g., destination telephone 115 in FIG. 1). The call may be placed in a variety of ways including speed dialing or voice-activated dialing. Irrespective of how the call is placed, the call is switched in a convention manner via communications network 103 and the call arrives at destination central office switch 105 (step 203).

In step 205, it is determined whether the call can be connected to the subscribed user. If the line is not busy, and the subscribed user answers within a specified number of rings, then a normal connection process occurs wherein the caller is connected to the subscribed user (step 207). If the line is busy, or the subscribed user doesn't answer within the specified number of rings, an in band prompt message is transmitted to the caller (step 209). The message may state, e.g., "The line is currently busy. Would you like your calling information to be added to the return call list?", or "The called party is currently unavailable. Would you like your information to be added to the return call list?" The system then waits for a response (step 211). If the caller answer answers in negative, the process is terminated (step 213), otherwise the process moves to step 215 wherein the corresponding ANI of the incoming call is captured by processor 107. Processor 107 queries the database 109 holding the caller information (step 217) and retrieves the other relevant information including caller name from database 109 (step 219). Processor 107 also generates a date and time stamp for this call by utilizing network clock 119 (step 221). Then, an entry for the return call list comprising relevant information about the caller and date and time of the call is then created and stored in local database 111 (step 223). The information in the return call list is available to the subscribed user for later use.

Please note that steps 209–213 are optional steps and may be eliminated. In this case, the caller is not provided with an option to choose whether he/she wishes to be added to the return call list. If the line is busy, or subscriber is unavailable, the process directly move to step 211 wherein corresponding ANI of the caller is captured by processor 107.

Figure 3:
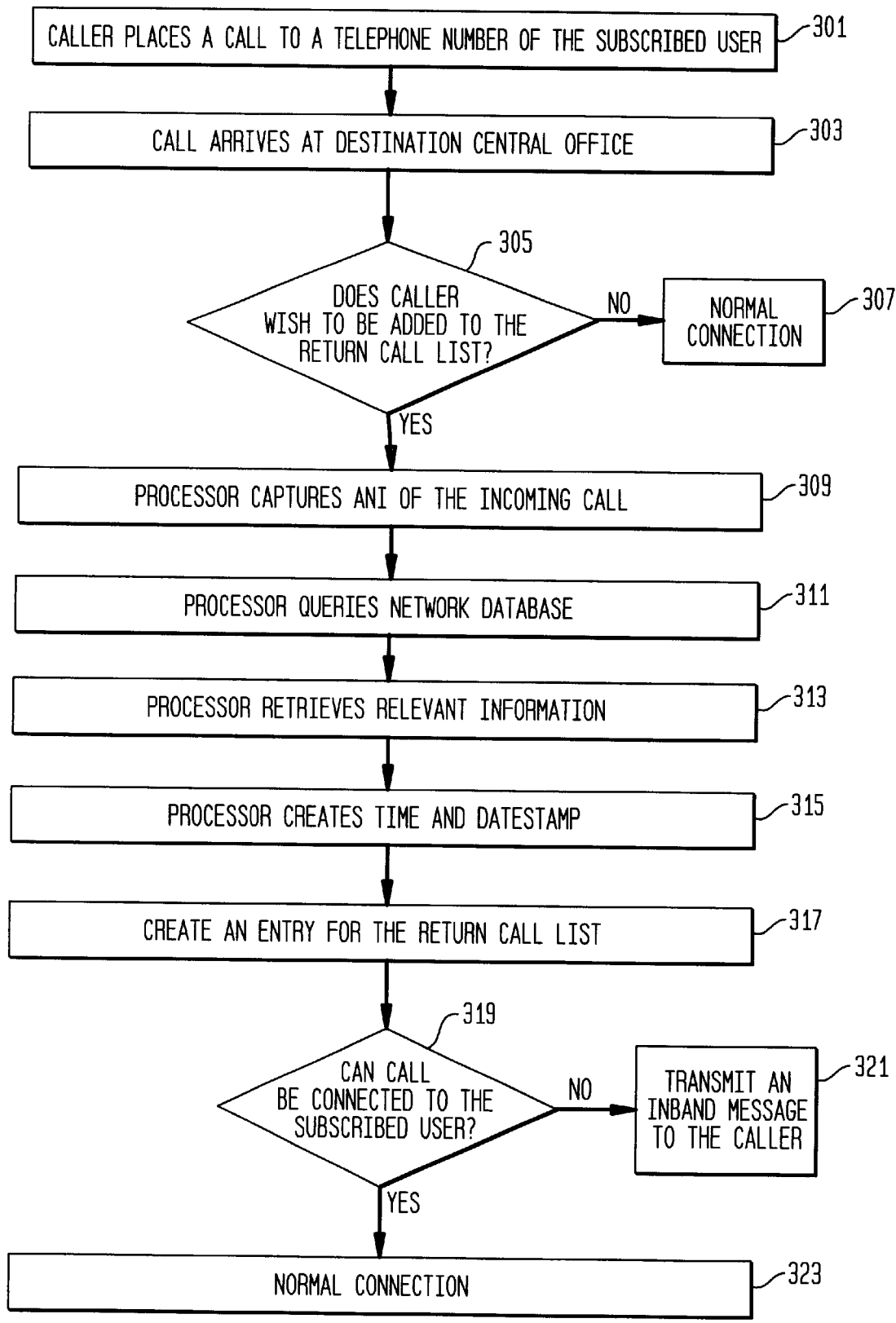
FIG. 3 shows a flow chart of an exemplary process for managing a telephone call to the subscribed user in accordance with a second embodiment of the present invention.

FIG. 3 represents an operational flowchart for handling a call to a user subscribed to the self-generating return call service in accordance with an alternative configuration the present invention. In this configuration a log of all incoming calls to the subscribed user is created. The dialed number (i.e., the number of the subscribed user) could be any number, including, for example, a plain old telephone service (POTS) number, a pager number, an 800 number, a mobile phone number, or a personal calling number.

The process begins in step 301 when a caller places a call to the telephone number of a user who is subscribed to the self-generating return call service of the present invention. The call may be placed in a variety of ways including speed dialing or voice-activated dialing. Irrespective of how the call is placed, the call is switched in a convention manner via communications network 103 and the call arrives at destination central office switch 105 (step 303).

The system then prompts the caller asking if he/she wishes to be added to the return call list. To accomplish this, processor 107 sends an in band inquiry to originating telephone 101 and waits for a response (step 305). The inquiry message may state, e.g., "The party you have called has subscribed to return call service, will you like to add your information in the return call list?" If the caller responds in the negative, a normal connection procedure takes place (step 307), otherwise the process moves to step 309 wherein the corresponding ANI of the incoming call is captured.

Processor 107 also queries the database 109 holding the caller information (step 311) and retrieves the other relevant information including caller name from database 109 (step 313). Processor 107 also creates a date and time stamp for this call (step 315). An entry for the user's return call list comprising relevant information about the caller and the date and time of the call is then created and stored in local database 111 (step 317).

In next step 319, it is determined whether the call can be connected to the user. If the line is not busy, and the subscribed user answers within a specified number of rings, then a normal connection process occurs (step 321). If the line is busy, or the user doesn't answer within a predetermined rings, another in band prompt message may be transmitted to the caller (step 323). The message may state, e.g., "The line is. currently busy, but your calling information has been added to the return call list", or "The called party is currently unavailable, but your information. has been added to the return call list."

Note that steps 305–309 are optional steps and may be omitted. In this case, after step 303 wherein calls arrives at the destination central office, the next step is step 311 wherein ANI of the incoming call is captured by processor 107. Herein, the caller is not provided with an option to choose whether he/she wishes to be added in the return call list, instead[]the ANI of the caller is automatically captured The principles of the present invention may also be expanded to paging devices. For example, if the called number is a pager number, then the process will end after acquiring the caller information and there will be no inquires to see if the caller can be connected. The caller information will be automatically captured and stored in the return list.

Accordingly, the present invention may be adapted as an enhancement of ordinary pager service. According to this enhanced pager service, when a calling party dials a pager number of the subscribed user, the communications network routes the call, and appropriate caller information is captured by the destination central office switch. The information is then added to a self-generating return call list. The paging device is then paged with the caller information. From the perspective of a calling party, such an enhanced paging system appears virtually identical to an ordinary paging system. The user, however, is provided with enhanced service because the subscriber may access the return call list from any telephone and need not to have the paging device in his/her possession in order to gain knowledge about the callers.

In a further application, a subscriber may selectively forward all incoming calls to the self generating return call list. With this call forwarding feature activated, all calls to the subscribing user are not routed to the user telephone, but, instead, the caller information is captured and stored in the return call list for further retrieval by the user. Later on, at the user's convenience, the user may access the return call list and return the calls.

The subscribed user is preferably provided easy access to the return call list. Generally, the subscribed user dials a designated access number from any telephone to access his/her return call list stored in the local database. In one implementation of the present invention, a toll-free number may be assigned as an access number. In this case, the user may easily access his/her return call list while traveling. Appropriately, it may also be determined whether the subscribed user is permitted to access the database. This permission may be determined by password means wherein the subscribed user must provide a correct password in order to access the return call list. In cases of password security, enhanced fee-bearing services may be offered to the user. For example, after the subscribed user has successfully accessed the return call list, the user may use long-distance service, 900 service, or other fee-bearing enhanced services.

Figure 4:
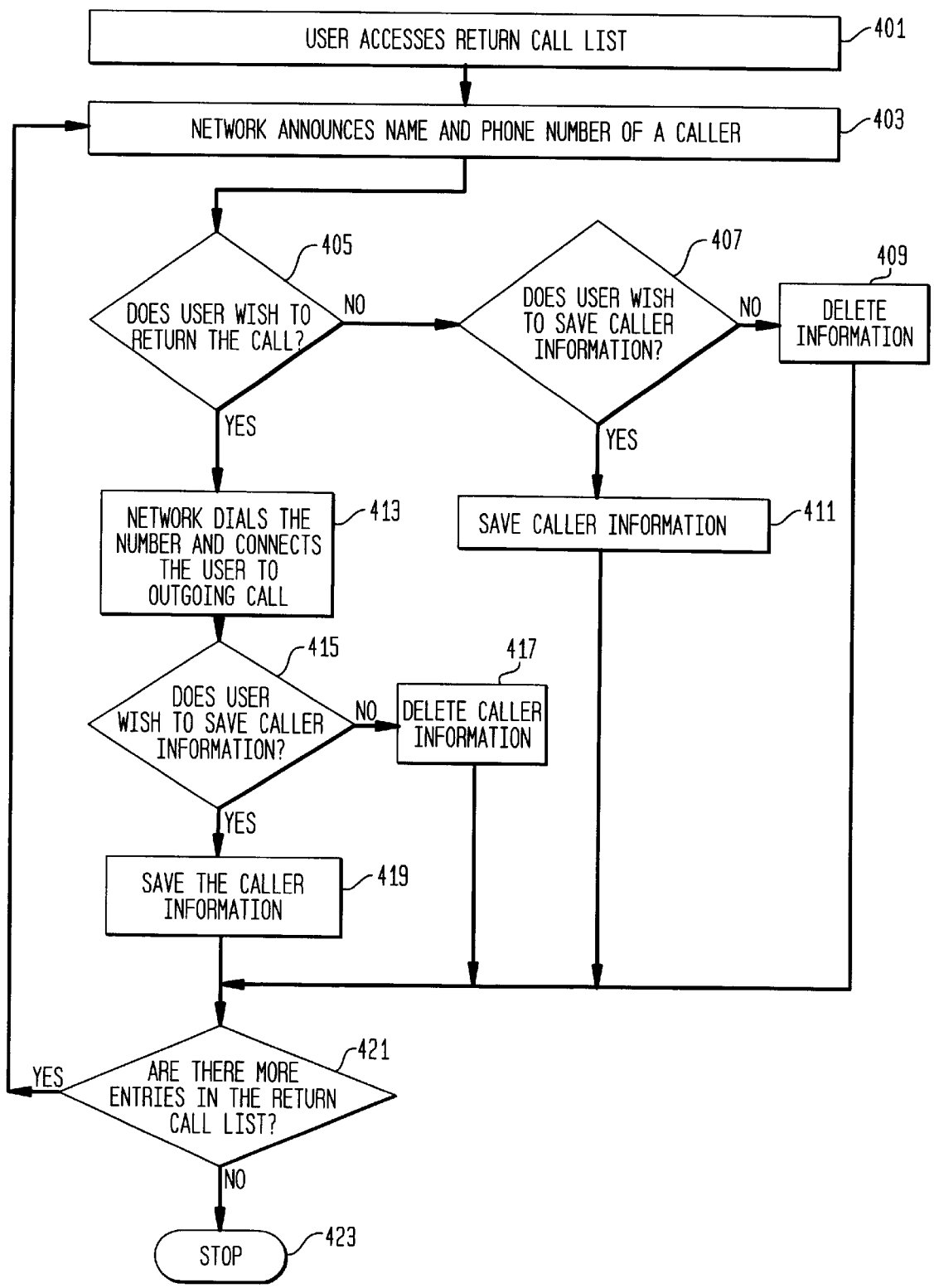
FIG. 4 illustrates a flow chart of an exemplary process wherein the subscribed user is provided with enhanced services when the user accesses the return call list.

In one embodiment, as shown in FIG. 4 when the user accesses the self-generating return call list (step 401), the network announces the name and phone numbers of the first caller corresponding to a first entry in the return call list (step 403). In step 405, the network prompts the user to inquire whether user wishes to return the call (step 407). This may be accomplished by sending an inland message to the user and by waiting for a response from the user. In an exemplary case, the user is asked to provide response by pressing appropriate push-keys on the telephone pad. For examples, key #1 on the telephone pad may correspond to a YES response and key #2 on the telephone pad may correspond to a NO response.

If the response from the user in step 405 indicates that user does not wish to return the call, the process moves to step 407 wherein user is prompted again to inquire whether user wishes to save caller information for the future use. If NO, the caller information is deleted in step 409 and the process moves to step 421 (discussed in detail later). However if the user wishes to save the caller information, the caller information is saved in step 411 and the process proceeds to step 421.

If in step 405, it is determined that the user wishes to return the call, the process directly moves to step 413. In step 413, the network dials the telephone number for the call, and connects the use to this outgoing call. Thus, user is provided with an automatic return call option. After the user has completed the first return call, in step 415, the user is prompted again to inquire whether user wishes to save the caller information (of the caller to whom the recent return call was placed). IF YES, the caller information is saved in step 419, and the process moves to step 421. If the user does not wish to save the information of the caller to whom the recent return call was placed, the caller information is deleted in step 417, and the process moves to step 421.

Step 421 is another decision function to determine whether there are remaining entries in the return call list. IF YES, the process returns back to step 403 wherein the network announces the name and phone number of the caller corresponding to the next entry in return call list. Steps 403–419 are then followed in the above-described manner. The iteration of steps 405-419 continue until in step 421 it is determined that there are no more entries in the return call list. The process then ends in step 423.

FIG. 4 and its related description is only way to provide customized options to the user. In other embodiments, the return call list may also be used for providing other network-based enhanced telecommunications services. For example, when the user accesses the return call list, he may be automatically connected to the last called party. The user may also be provided with voice-activated dialing and conference call features. The enhanced services may include a range of other customized features, and one or more of these customized features may be available to the user depending on the user'needs or desires (e.g., as specified in a user profile). These user specific profiles may be stored by the network, and may be accessed and modified by the user.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope.; For example, although the self-generating return call method was described hereinabove in connection with a communications network switching and handling calls, it is understood by one skilled in the art that such a return call method may be implemented within a central office switch wherein the caller and the subscribed user both are connected to the same central office switch.

The invention may be practiced across international network boundaries. It is understood, however, that if such a service is offered internationally, then calls originating from, or directed to, locations not within the user's local coverage areas, would have to be routed appropriately through an interexchange network. These and other changes can be made without departing from the spirit and the scope of the invention and without diminishing its attendant advantages. It is therefore intended that the present invention is not limited to the disclosed embodiments but should be defined in accordance with the claims which follow.

It will be further understood that various changes in the details, materials, and arrangements of the parts which have been described and illustrated in order to explain the nature H) of this invention may be made by those skilled in the art without departing from the scope of the invention as expressed in the following claims.

What is claimed is:

1. A method for processing telephone calls, comprising the steps of:

(a) receiving an incoming telephone call from a caller intended for a service subscriber;

(b) automatically capturing caller information and generating an entry in a return call list for the service subscriber, wherein the entry in the return call list is generated for all incoming calls to the service subscriber independent of whether or not the incoming call is connected to the service subscriber; and (c) enabling the service subscriber to subsequently access the return call list to retrieve the entry for the caller and place a return telephone call to the caller without requiring the service subscriber to enter a telephone number for the caller.

2. The invention of claim 1, wherein the caller information comprises caller ID information embedded in the incoming call.

3. The invention of claims 2, wherein step (b) further comprises the step of accessing additional caller information from a network database based on the caller ID information.

4. The invention of claim 1, wherein step (c) comprises the step of enabling the service subscriber to sequentially review each entry in the return call list and determine whether to place a return telephone call to the corresponding caller at that time or to save the entry for future review.

5. The invention of claim 4, wherein step (c) comprises the steps of:

(1) generating an audio message to the service subscriber identifying the caller by name; and (2) receiving an instruction from the service subscriber as to whether to place the return telephone call-to the caller.

6. The invention of claim 5, wherein the audio message further identifies time of receipt of the incoming call.

7. A system for processing telephone calls, comprising:

(a) means for receiving an incoming telephone call from a caller intended for a service subscriber;

(b) means for automatically capturing caller information and generating an entry in a return call list for the service subscriber, wherein the entry in the return call list is generated for all incoming calls to the service subscriber independent of whether or not the incoming call is connected to the service subscriber; and (c) means for enabling the service subscriber to subsequently access the return call list to retrieve the entry for the caller and place a return telephone call to the caller without requiring the service subscriber to enter a telephone number for the caller.

8. In a telephone network, a telephone call processing sub-system, comprising:

a processor configured to the telephone network; and a database memory configured to the processor, wherein:

the processor is configured to receive caller information regarding an incoming telephone call from a caller intended for a service subscriber;

the processor is configured to automatically generate an entry in a return call list for the service subscriber and stored in the database memory, wherein the entry in the return call list is generated for all incoming calls to the service subscriber independent of whether or not the incoming call is connected to the service subscriber; and the processor enables the service subscriber to subsequently access the return call list from the database memory to retrieve the entry for the caller and place a return telephone call to the caller without requiring the service subscriber to enter a telephone number for the caller.

\* \* \* \* \*